(12) United States Patent
Yamada et al.

(10) Patent No.: US 10,995,805 B2
(45) Date of Patent: May 4, 2021

(54) STRUCTURE OF RATCHET TYPE ONE-WAY CLUTCH

(71) Applicant: NSK-WARNER K.K., Tokyo (JP)

(72) Inventors: Takaya Yamada, Fukuroi (JP); Osamu Katayama, Fukuroi (JP)

(73) Assignee: NSK-WARNER K.K., Tokyo (JP)

( * ) Notice: Subject to any disclaimer, the term of this patent is extended or adjusted under 35 U.S.C. 154(b) by 50 days.

(21) Appl. No.: 16/199,343

(22) Filed: Nov. 26, 2018

(65) Prior Publication Data

US 2019/0162250 A1    May 30, 2019

(30) Foreign Application Priority Data

Nov. 29, 2017    (JP) .............................. JP2017-229186

(51) Int. Cl.
*F16D 41/14*    (2006.01)

(52) U.S. Cl.
CPC .......... *F16D 41/14* (2013.01); *F16D 2300/12* (2013.01); *F16D 2300/26* (2013.01)

(58) Field of Classification Search
CPC .............................. F16D 41/14; F16D 2300/12
See application file for complete search history.

(56) References Cited

U.S. PATENT DOCUMENTS

| 3,055,351 | A  | * | 9/1962  | Siwek ....................... F02N 5/02 |
| | | | | 123/185.14 |
| 9,676,233 | B1 | * | 6/2017  | Chen ..................... B60B 27/047 |
| 2002/0005327 | A1 | * | 1/2002  | Muramatsu ............. F16D 41/12 |
| | | | | 192/46 |
| 2002/0148697 | A1 | * | 10/2002 | Muramatsu ............. F16D 41/12 |
| | | | | 192/46 |
| 2013/0228410 | A1 | * | 9/2013  | Sugimura ............... F16D 41/12 |
| | | | | 192/45.1 |
| 2014/0246894 | A1 | * | 9/2014  | Chen ..................... B60B 27/047 |
| | | | | 301/6.9 |
| 2016/0348741 | A1 | * | 12/2016 | Niemiec ................. F16D 41/14 |
| 2016/0356323 | A1 |   | 12/2016 | Endo et al. |

FOREIGN PATENT DOCUMENTS

| GB | 564864 | * | 4/1943 |
| JP | 2016-223578 A | | 12/2016 |

\* cited by examiner

*Primary Examiner* — Mark A Manley
(74) *Attorney, Agent, or Firm* — SGPatents PLLC

(57) ABSTRACT

A structure of a ratchet type one-way clutch that enables a reduction of the installation space along the direction of the center axis and high torque setting. The structure includes a securing member arranged on the center axis of a ratchet type one-way clutch and having a holding portion opposed to the ratchet type one-way clutch in the axial direction. The outer race of the ratchet type one-way clutch is provided with a first fit portion including a plurality of through holes. The holding portion is provided with a second fit portion including a plurality of projections that is in fitting engagement with the first fit portions, respectively.

8 Claims, 4 Drawing Sheets

STRUCTURE OF RATCHET TYPE ONE-WAY CLUTCH

The disclosure of the following priority application is herein incorporated by reference:
Japanese Patent Application No. 2017-229186.

TECHNICAL FIELD

The present invention relates to a structure of a ratchet type one-way clutch used in vehicles or the like.

BACKGROUND ART

Conventional one-way clutches are typically composed of outer and inner races and a torque transmission mechanism using sprags, a ratchet mechanism or the like. For example, in cases where a one-way clutch having a ratchet structure is to be fixedly attached to an output shaft, it is necessary to retain the one-way clutch by a retaining member to prevent disassembly of the one-way clutch and to attach the retaining member that retains the one-way clutch to the output shaft together with a flywheel (see, for example, Patent literature 1 in the citation list below).

Patent Literature 1 discloses a structure including a ratchet type one-way clutch. In that structure, a retaining member that retains the ratchet type one-way clutch is fixed to an output shaft together with a flywheel. Thus, the ratchet type one-way clutch disclosed in Patent Literature 1 is attached to the output shaft together with the flywheel with the retaining member between. This structure requires an increased space along the direction of the center axis for installation of the ratchet type one-way clutch.

The demand for reduction of the installation space along the axial direction is increasing nowadays, and the demand for ratchet type one-way clutches that can be used with high torque setting are also increasing.

CITATION LIST

Patent Literature

Patent Literature 1: Japanese Patent Application Laid-Open No. 2016-223578 corresponding to United States Patent Application Publication No.: US 2016/0356323 A1

SUMMARY OF INVENTION

Technical Problem

FIG. 4 illustrates a conventional ratchet type one-way clutch 20. As shown in FIG. 4, the ratchet type one-way clutch 20 is attached to an output shaft (not shown) together with a flywheel 21 by a retaining member 22 that retains the ratchet type one-way clutch 20. This leads to an increase in the installation space along the direction of the center axis. To prevent an increase in the installation space along the direction of the center axis, it is not possible to use a retaining member 22 having a large thickness, leading to difficulty in high torque setting.

The present invention has been made in view of the above-described circumstances, and an object of the present invention is to provide a structure of a ratchet type one-way clutch that enables a reduction of the installation space along the direction of the center axis and high torque setting.

Solution to Problem

To solve the above problem, according to the present invention, there is provided a structure of a ratchet type one-way clutch having an outer race, an inner race arranged radially inside and coaxially with said outer race, and a ratchet mechanism provided between said outer race and said inner race, comprising:
a securing member arranged on the center axis of said ratchet type one-way clutch and having a holding portion opposed to said ratchet type one-way clutch in the direction of the center axis,
wherein said outer race is provided with a first fit portion, and said holding portion is provided with a second fit portion that is in fitting engagement with said first fit portion to hold said ratchet type one-way clutch.

Advantageous Effect of Invention

The present invention can provide a structure of a ratchet type one-way clutch that enables a reduction of the installation space along the direction of the center axis and high torque setting.

EMBODIMENTS FOR CARRYING OUT THE INVENTION

In the following, first and second embodiments of the structure of a ratchet type one-way clutch according to the present invention will be described with reference to the accompanying drawings.

Some terms relating to the structure of the ratchet type one-way clutches according to the first and second embodiments will be firstly described with reference to the drawings.

Figure 2:
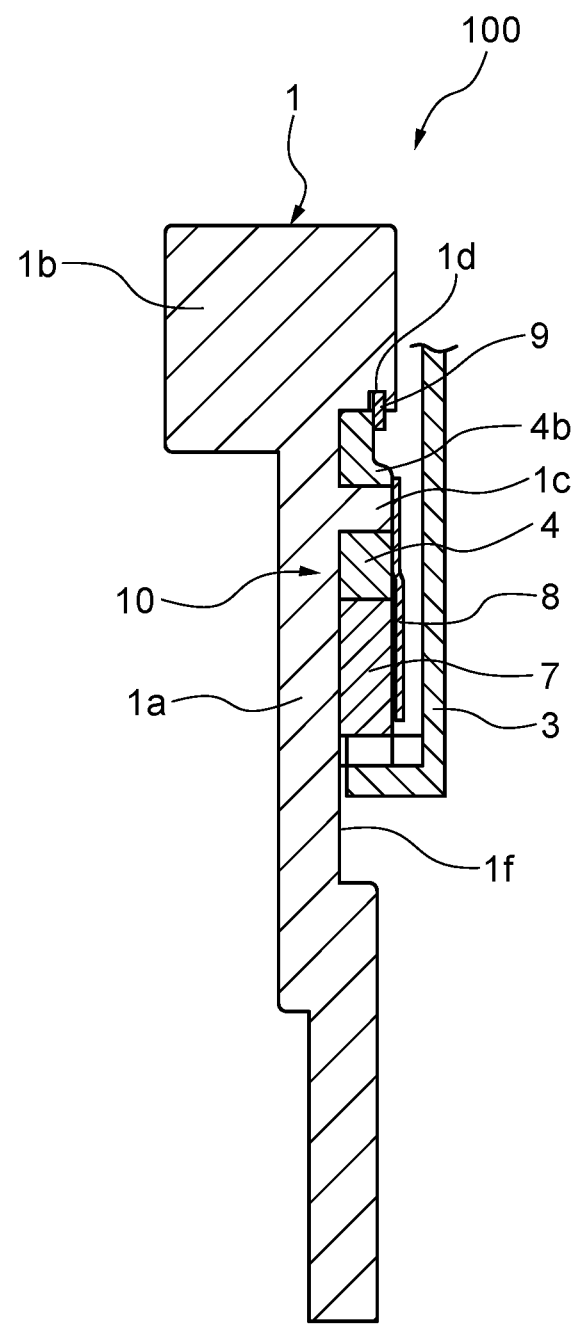
FIG. 2 is a cross sectional view of the ratchet type one-way clutch, a holding plate, and the securing member according to the first embodiment taken along the center axis.
Figure 3:
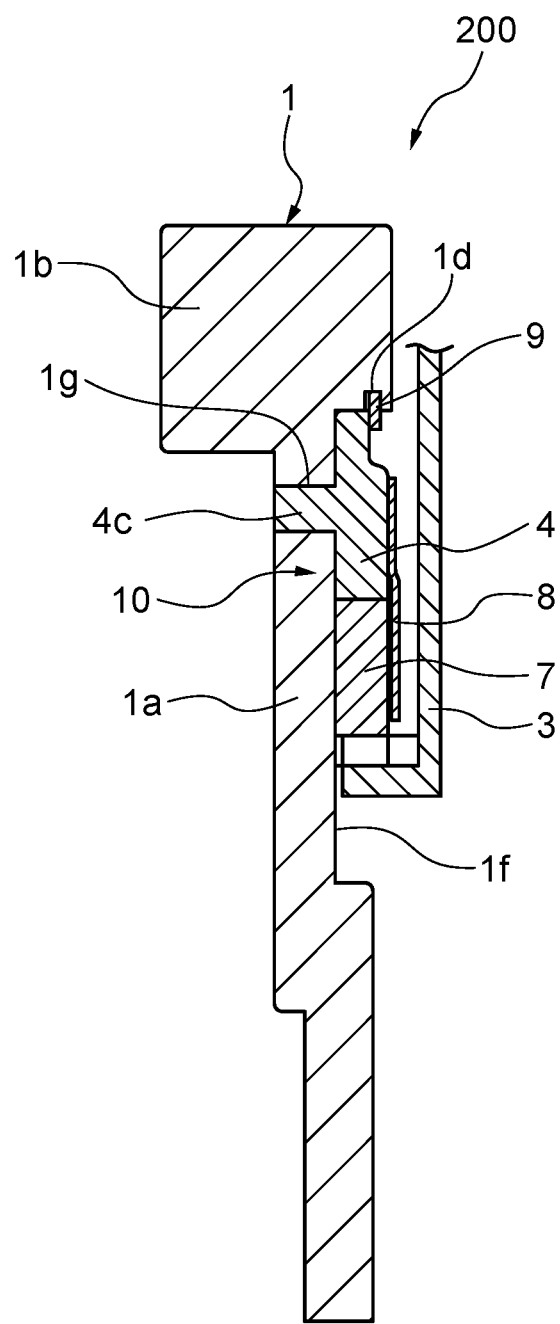
FIG. 3 is a cross sectional view of a ratchet type one-way clutch, a holding plate, and a securing member according to a second embodiment taken along the center axis.

In the description of the first and second embodiments, the term "center axis" refers to the center axis of the ratchet type one-way clutch, and the terms "axial direction", "radial direction", and "circumferential direction" respectively refer to the axial direction, radial direction, and circumferential direction with respect to that center axis. As to the axial direction, the term "first axial side" refers to the axial side on the front side of the plane of the drawing sheet of FIG. 1 (namely, the side facing the viewer of FIG. 1), and the term "second axial side" refers to the axial side on the back side of the plane of the drawing sheet of FIG. 1 (namely, the side facing away from the viewer of FIG. 1). In FIGS. 2 and 3, the right side is the first axial side, and the left side is the second axial side.

In the following, the structure of the ratchet type one-way clutch according to the first embodiment of the present invention will be described.

Figure 1:
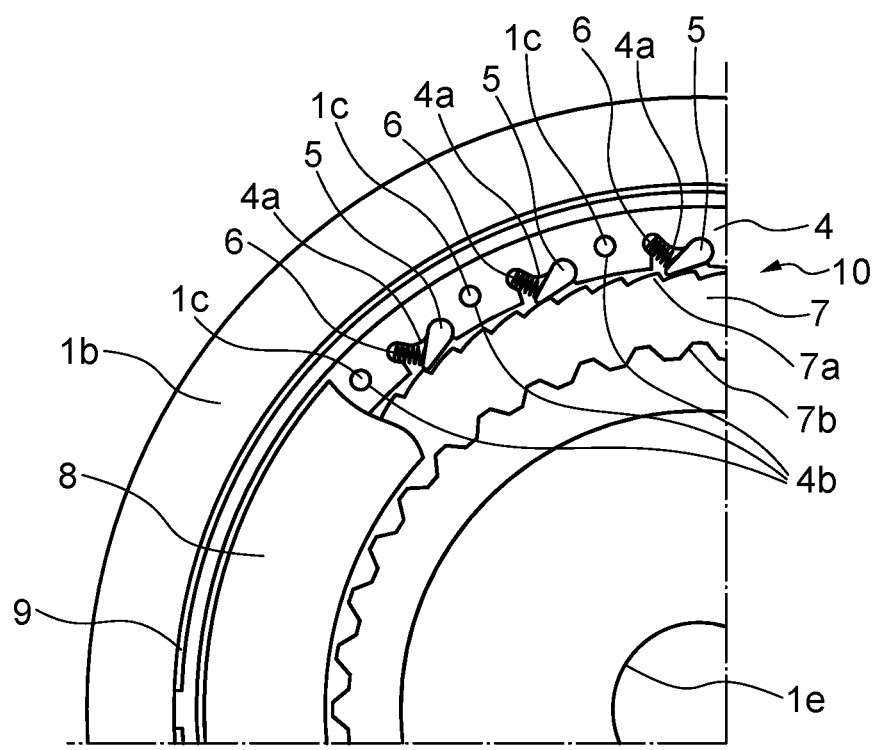
FIG. 1 is a front view showing a ratchet type one-way clutch and a securing member according to a first embodiment.

FIG. 1 is a front view of a ratchet type one-way clutch 10 and a securing member 1 that securely holds the ratchet type one-way clutch 10 according to the first embodiment seen from the first axial side. FIG. 1 shows only a quarter of the ratchet type one-way clutch 10 and the securing member 1 over a circumferential range of about 90 degrees about the center axis, and the other part is not illustrated for the sake of convenience. In FIG. 1, an annular holding plate 3 and a part of an annular stopper plate 8 shown in FIG. 2 are not illustrated.

FIG. 2 is a cross sectional view of the ratchet type one-way clutch 10, an annular holding plate 3, and the securing member 1 according to the first embodiment taken along the center axis. The location of the cross section shown in FIG. 2 is selected to show a projection 1c, which will be described later.

Figure 4:
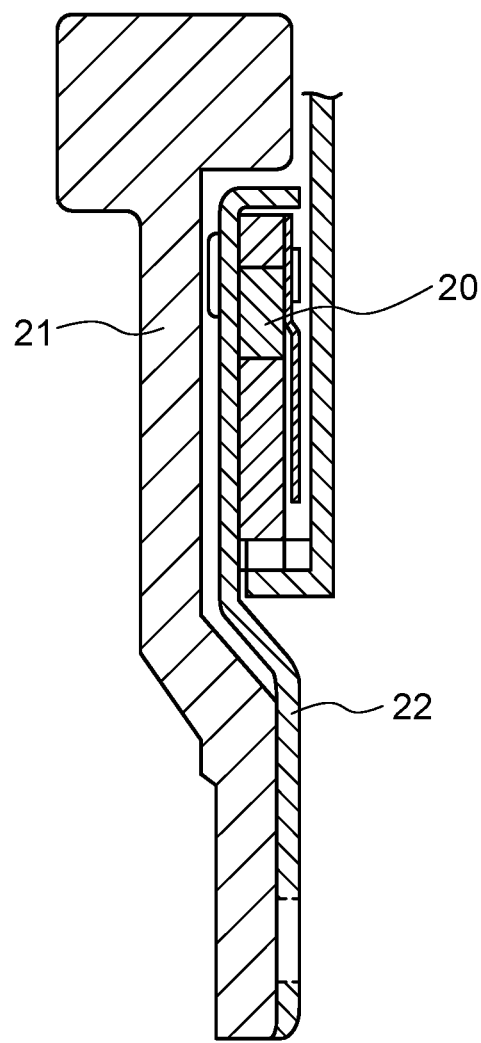
FIG. 4 is a cross sectional view of a ratchet type one-way clutch, a holding plate, and a securing member according to a prior art taken along the center axis.

The structure 100 of the ratchet type one-way clutch according to the first embodiment is characterized in that the conventional retaining member 22 shown in FIG. 4 is eliminated and that the ratchet type one-way clutch 10 is fixedly secured on the securing member 1 directly to form an integral unit structure. The securing member 1 may be a power transmission member, which may be, for example, a flywheel to be attached to the output shaft of an internal combustion engine of a vehicle. In the following, the structure 100 of the ratchet type one-way clutch according to the first embodiment will be described as an exemplary structure including a flywheel serving as the securing member 1.

As shown in FIGS. 1 and 2, the ratchet type one-way clutch 10 includes an outer race 4, an inner race 7, and an annular stopper plate 8 on the first axial side of the outer race 4 and the inner race 7. The inner race 7 is arranged coaxially with and radially inside the outer race 4 with a gap therebetween. The inner race 7 is rotatable relative to the outer race 4. The inner circumference of the outer race 4 is provided with a plurality of recesses 4a that open radially inwardly and are spaced uniformly along the circumferential direction. A pawl member 5 and a spring 6 are provided in each of the recesses 4a. The spring 6 is a coil spring adapted to bias the end portion of the pawl member 5 toward the inner race 7, or radially inwardly.

The outer circumference of the inner race 7 is provided with ratchet teeth 7a arranged along the circumferential direction. The ratchet teeth 7a engage the pawl members 5 in one-to-one correspondence. The recesses 4a, the pawl members 5, the springs 6, and the ratchet teeth 7a constitute a ratchet mechanism. Thus, the ratchet type one-way clutch 10 has a ratchet mechanism provided between the outer race 4 and the inner race 7.

The inner circumference of the inner race 7 is provided with a spline 7b with which a spline formed on the holding plate 3 is engaged to fix the inner race 7. The stopper plate 8 is fixedly attached to the outer race 4 to prevent the pawl members 5, the springs 6, and the inner race 7 from moving in the direction toward the plate 8 (i.e. the first axial direction). The ratchet type one-way clutch 10 acts in such a way as to be locked or engaged when the inner race 7 rotates relatively in the right (or clockwise) direction and to allow free rotation when the inner race rotates relatively in the left (or anticlockwise) direction.

The securing member 1 is arranged coaxially with the ratchet type one-way clutch 10. The securing member 1 has a disk-like center part 1a and an annular part 1b on the radially outer side of the center part 1a. The annular part 1b is integral with the center part 1a. The disk-like center part 1a is disposed coaxially with the center axis on the second axial side of the ratchet type one-way clutch 10.

The center part 1a of the securing member 1 has a first axial side surface 1f that is opposed, in the axial direction, to the second axial side end of the ratchet type one-way clutch 10. More specifically, that surface 1f of the center part 1a is opposed, in the axial direction, to the second axial side end surface of the outer race 4 and the second axial side end surface of the inner race 7 of the ratchet type one-way clutch 10. The surface 1f of the center part 1a is arranged to form a right angle with the center axis. In other words, the surface 1f is a flat surface perpendicular to the center axis. As will be described later, the ratchet type one-way clutch 10 is fixedly held on the surface 1f of the center part 1a.

The annular part 1b of the securing member 1 has a larger axial dimension than the center part 1a and projects beyond the center part 1a on the first axial side (namely toward the ratchet type one-way clutch 10) and on the second axial side. The securing member 1 in the first embodiment is a flywheel having the center part 1a and the annular part 1b as described above.

The aforementioned surface 1f of the center part 1a is provided with projections 1c that project on the first axial side, namely toward the ratchet type one-way clutch 10. The projections are arranged at equal intervals along the circumferential direction. The center part 1a has a shaft hole 1e at its center, through which a shaft (not shown) is to be inserted. For example, the crankshaft of an engine is inserted into the shaft hole 1e.

The ratchet type one-way clutch 10 is disposed radially inside the annular part 1b. The outer race 4 of the ratchet type one-way clutch 10 is formed with a plurality of through holes 4b that pass through it along the direction of the center axis. The through holes 4b are arranged circumferentially at equal intervals. The through holes 4b serve as the first fit portion. The number of the through holes 4b is equal to the number of the plurality of projections is of the center part 1a of the securing member 1. The plurality of projections 1c of the center part 1a serve as the second fit portion and are fitted in the plurality of through holes 4b in the outer race 4 serving as the first fit portion in one-to-one correspondence. The through holes 4b may be replaced by recesses not passing through the outer race 4. In that case, the length or height of the projections 1c may be designed to match with the depth of the recesses. In this embodiment, the projection 1c has a cylindrical shape. But the projection 1c may have another shape, such as a semicylinder shape or a square column shape. The bore of the through hole 4b or the above-mentioned recess may have a shape other than the cylindrical shape accordingly.

The inner circumferential surface of the annular part 1b that projects beyond the center part 1a on the first axial side is provided with a circumferential groove 1d that extends all along the circumference. A retaining ring 9 is fitted in the circumferential groove 1d. The retaining ring 9 is opposed, in the axial direction, to the outer race 4 on its side facing away from the surface 1f of the center part 1a. More specifically, the second axial side surface of the retaining ring 9 is opposed, in the axial direction, to and in contact with the radially outer end portion of the first axial side surface of the outer race 4.

In the structure according to the first embodiment, the fitting of the plurality of projections 1c of the securing member 1 in the plurality of through holes 4b of the outer race 4 couples the securing member 1 and the outer race 4 together. Thus, the securing member 1 and the ratchet type one-way clutch 10 form an integral unit. This structure enables the ratchet type one-way clutch 10 to resist the load that may otherwise cause relative rotation of the securing member 1 and the outer race 4 about the center axis.

In the structure according to the first embodiment, the first axial side surface of the outer race 4 abuts the second axial side surface of the retaining ring 9, thereby restricting the movement of the ratchet type one-way clutch 10 in the direction toward the first axial side. This structure enables the ratchet type one-way clutch 10 to resist the load that acts in such a direction that separates the securing member 1 and the ratchet type one-way clutch 10 away from each other along the direction of the center axis.

As above, according to the first embodiment, the outer race 4 of the ratchet type one-way clutch 10 is fixed directly to the securing member 1 to form an integral unit. This structure can eliminate the need for a conventional retaining member used to assemble the ratchet type one-way clutch 10 to the securing member 1, thereby reducing the installation space of the ratchet type one-way clutch 10 along the direction of the center axis. The elimination of the conventional retaining member leads to a reduction in the number of parts and a reduction in the manufacturing cost. Moreover, the integral unit structure of the ratchet type one-way clutch 10 and the securing member 1 acting as a power transmission member enables transmission of increased torque. Therefore, this structure allows high torque setting. The shape of the securing member 1 may be changed fitly according to the shape of the space in which the securing member 1 is set, namely the shapes of the components around it.

The structure of the ratchet type one-way clutch according to the first embodiment can be applied to various rotation transmission systems as well as the above-described system, where a flywheel serves as the securing member.

Next, a structure of a ratchet type one-way clutch according to a second embodiment of the present invention will be described with reference to the drawings.

The following description of the structure of the ratchet type one-way clutch according to the second embodiment will be mainly directed to features that are different from the structure according to the first embodiment, and features similar to the structure according to the first embodiment will be denoted by the same reference signs used in FIGS. 1 and 2 with detailed descriptions being omitted.

The structure 200 of the ratchet type one-way clutch according to the second embodiment differs from the structure according to the first embodiment in the fit structure of the outer race 4 of the one-way clutch 10 and the securing member 1. The structure other than this is the same as that according to the first embodiment.

FIG. 3 is a cross sectional view of the ratchet type one-way clutch 10, the holding plate 3, and the securing member 1 according to the second embodiment taken along the center axis. The location of the cross section shown in FIG. 3 is selected to show a projection 4c, which will be described later.

In the structure according to the second embodiment, the outer race 4 is provided with a plurality of projections 4c serving as the first fit portion in place of the through holes 4b in the first embodiment. The projections 4c project to the second axial side, namely toward the securing member 1. The projections 4c are arranged circumferentially at equal intervals. The center part 1a of the securing member 1 is provided with through holes 1g serving as the second fit portion in place of the projections 1c in the first embodiment. The through holes 1g pass through the center part 1a from its surface 1f of the center part 1a along the direction of the center axis. The through holes 1g are arranged circumferentially at equal intervals. The number of the plurality of projections 4c on the outer race 4 is equal to the number of the through holes 1g provided in the center part 1a of the securing member 1, and the projections 4c are fitted in the through holes 1g in one-to-one correspondence. As in the first embodiment, the through holes 1g may be replaced by recesses not passing through the center part 1a. In that case, the length or height of the projections 4c may be designed to match with the depth of the recesses. In this embodiment, the projection 4c has a cylindrical shape. But the projection 4c may have another shape, such as a semi-cylinder shape or a square column shape. The bore of the through hole 1g or the above-mentioned recess may have a shape other than the cylindrical shape accordingly.

In the structure according to the second embodiment, the fitting of the plurality of through holes 1g of the securing member 1 and the plurality of projections 4c of the outer race 4 couples the securing member 1 and the outer race 4 together. Thus, the securing member 1 and the ratchet type one-way clutch 10 form an integral unit. The structure according to the second embodiment other than described above is the same as that of the first embodiment.

As with the structure according to the first embodiment, the structure according to the second embodiment can eliminate the need for a conventional retaining member used to assemble the ratchet type one-way clutch 10 to the securing member 1 and therefore can provide advantageous effects the same as the first embodiment.

REFERENCE SINGS LIST 100, 200: structure of ratchet type one-way clutch
10: ratchet type one-way clutch
1: securing member
1a: center part
1b: annular part
1c: projection
1d: circumferential groove
1e: shaft hole
1f: surface
1g: through hole
3: holding plate
4: outer race
4a: recess
4b: through hole
4c: projection
5: pawl member
6: spring
7: inner race
7a: ratchet tooth
7b: spline
8: stopper plate
9: retaining ring
20: ratchet type one-way clutch
21: flywheel
22: retaining member

What is claimed is:

1. A structure of a ratchet type one-way clutch having an outer race, an inner race arranged radially inside and coaxially with said outer race, and a ratchet mechanism provided between said outer race and said inner race, wherein: said ratchet type one-way clutch is provided on and in direct contact with one surface of a disk-like center part of a flywheel arranged on a center axis of said one-way clutch to be attached to an output shaft of an internal combustion engine, said flywheel having a one piece integral structure inclusive of said disk-like center part, said ratchet mechanism includes a plurality of pawl members provided on said outer race, and ratchet teeth provided on said inner race to engage with said pawl members said outer race is formed with a first fit portion, and said disk-like center part is formed with a second fit portion that is in fitting engagement with said first fit portion, said second fit portion receiving said first fit portion in the first direction of the center axis, and said one surface of said disk-like center part has a flat surface in direct contact with said pawl members in the first direction of the center axis and holding said pawl members in the first direction of the center axis.

2. A structure of a ratchet type one-way clutch according to claim 1, wherein said first fit portion comprises a plurality of through holes or recesses, and said second fit portion comprises a plurality of projections, the number of said projections being equal to the number of said through holes or recesses.

3. A structure of a ratchet type one-way clutch according to claim 1, wherein said first fit portion comprises a plurality of projections, and said second fit portion comprises a plurality of through holes or recesses, the number of said projections being equal to the number of said through holes or recesses.

4. A structure of a ratchet type one-way clutch according to claim 1, wherein said flywheel has an annular portion located radially outside said disk-like center part and projecting toward said ratchet type one-way clutch in a second direction of the center axis, and the structure further comprises a retaining ring fitted in a circumferential groove provided on an inner circumferential surface of said annular portion and opposed to said outer race on a side opposite to said holding portion in the second direction of the center axis.

5. A structure of a ratchet type one-way clutch according to claim 1, wherein said one surface of said disk-like center part comprises a surface perpendicular to said center axis.

6. A structure of a ratchet type one-way clutch having a first raceway ring, a second raceway ring radially opposed to said first raceway ring, and a ratchet mechanism provided between said first raceway ring and said second raceway ring, wherein:

said ratchet type one-way clutch is provided on and in direct contact with one surface of a disk-like center part of a flywheel arranged on a center axis of said one-way clutch to be attached to an output shaft of an internal combustion engine, said flywheel having a one piece integral structure inclusive of said disk-like center part, said ratchet mechanism includes a plurality of pawl members provided on the first raceway ring, and ratchet teeth provided on the second raceway ring to engage with said pawl members, said first raceway ring is formed with a first fit portion, and said disk-like center is formed with a second fit portion that is in fitting engagement with said first fit portion, said second fit portion receiving said first fit portion in a direction of the center axis; and said one surface of said disk-like center part has a flat surface in direct contact with said pawl members in the direction of the center axis and holding said pawl members in the direction of the center axis.

7. A structure of a ratchet type one-way clutch according to claim 6, wherein said second fit portion comprises a through hole or recess, and said first fit portion comprises a projection received in said recess.

8. A structure of a ratchet type one-way clutch according to claim 6, wherein said second fit portion comprises a projection, and said first fit portion comprises a hole or recess received on said projection.

* * * * *